Dec. 11, 1962     F. E. VALLEY     3,067,835
FOLDING STEP
Filed Aug. 5, 1960     2 Sheets-Sheet 1
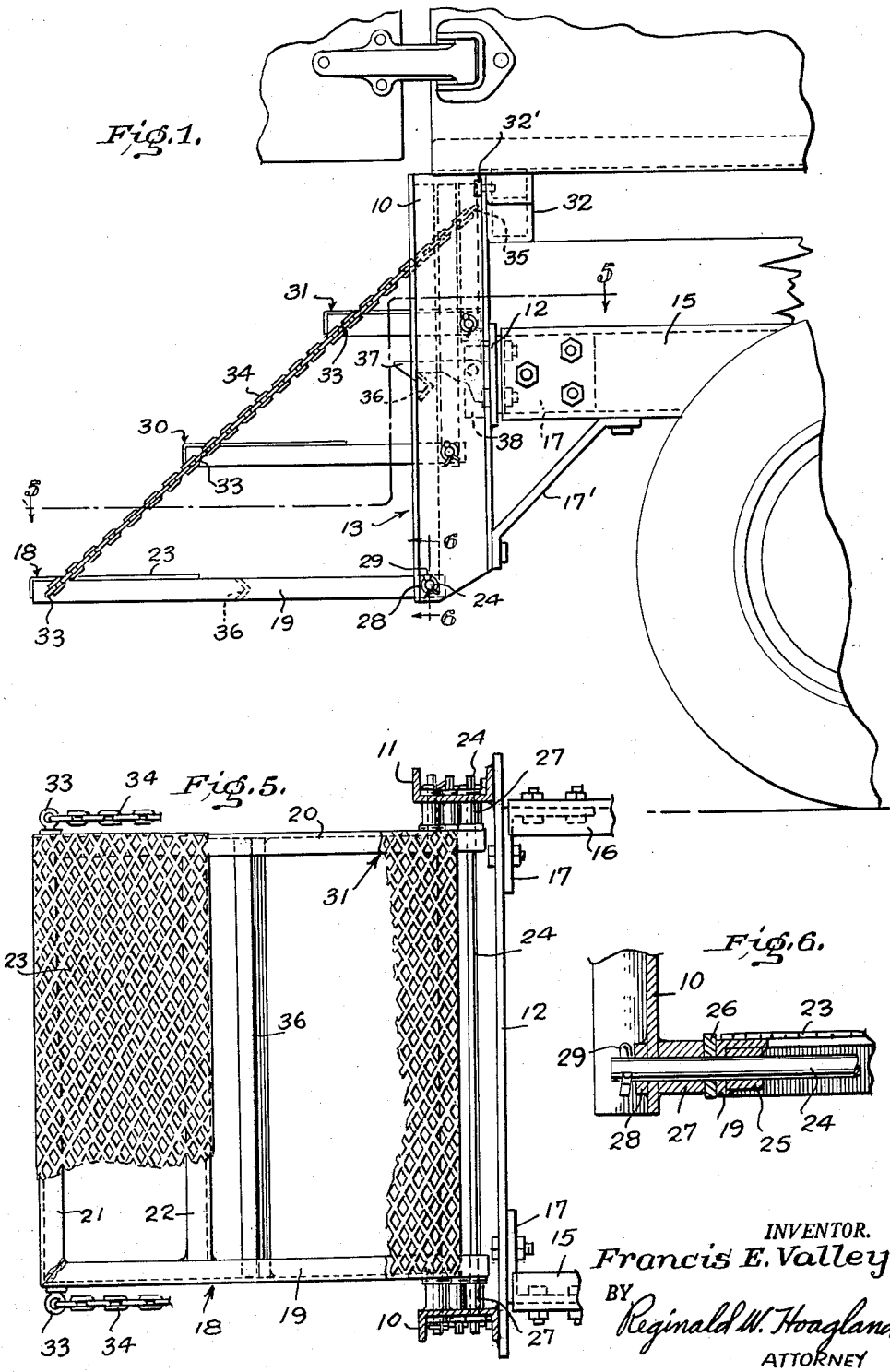
INVENTOR.
*Francis E. Valley*
BY
*Reginald W. Hoagland*
ATTORNEY Dec. 11, 1962   F. E. VALLEY   3,067,835
FOLDING STEP
Filed Aug. 5, 1960   2 Sheets-Sheet 2
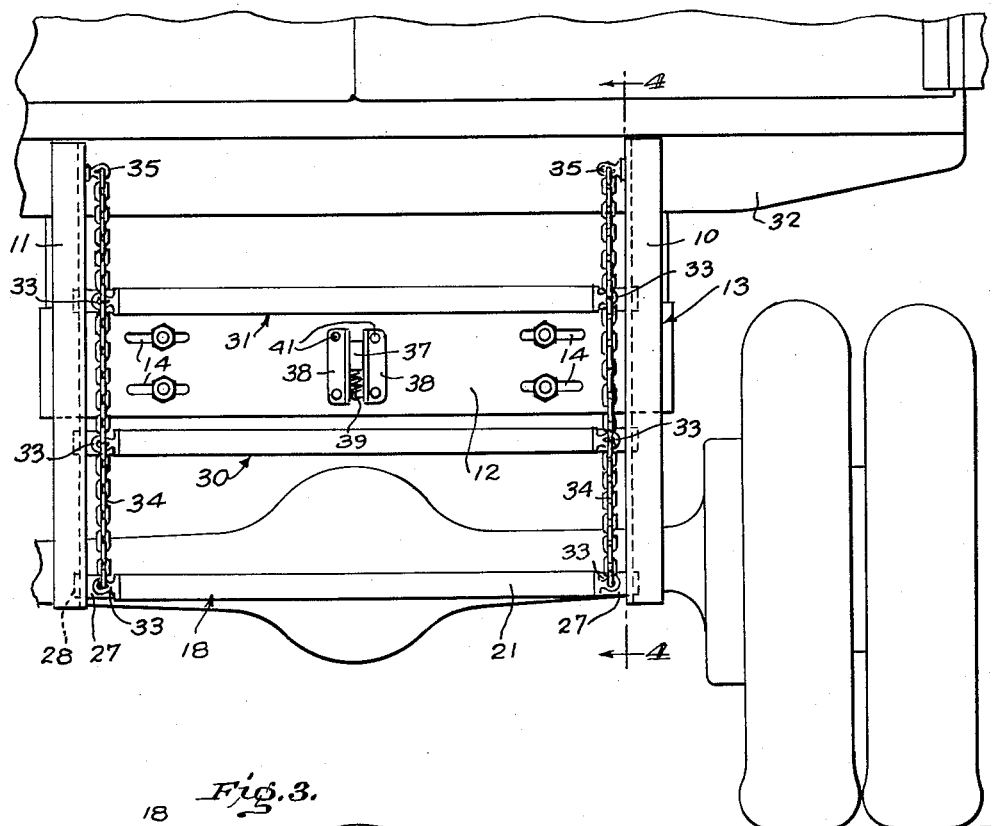
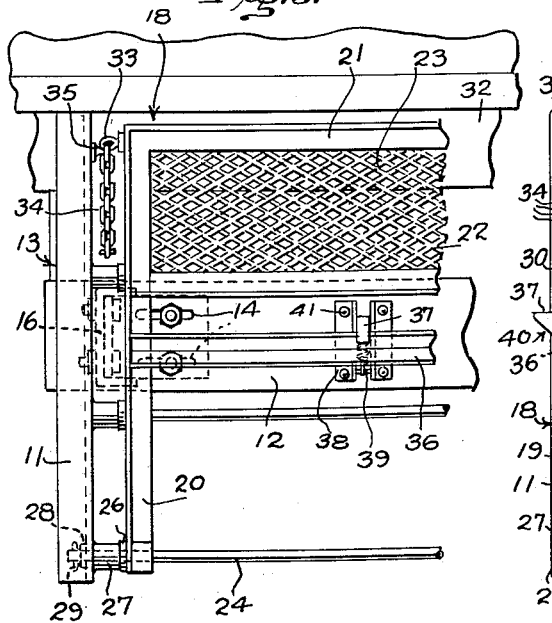
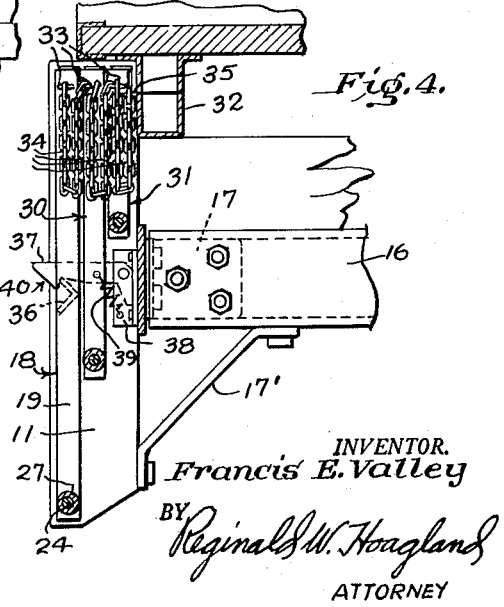
INVENTOR.
Francis E. Valley
BY
Reginald W. Hoagland
ATTORNEY 3,067,835
FOLDING STEP
Francis E. Valley, G-6265 N. Saginaw Road,
Mount Morris, Mich.
Filed Aug. 5, 1960, Ser. No. 47,678
2 Claims. (Cl. 182—95)

The present invention relates to a folding step for vehicles. More specifically, the present invention relates to a folding step for vehicles wherein one or more step frames are pivoted respectively upon parallel pivot rods disposed in vertical and horizontal stepped relationship, maintained in stepped disposition by collapsible suspension means when disposed for use, and maintained in compact, vertical disposition when folded.

An object of this invention is to provide a step for vehicles which may be folded into a compact disposition and thus retained while the vehicle is in motion.

Another object of this invention is to provide a folding step in which step frames are pivoted upon parallel pivot rods disposed in vertical and horizontal stepped relationship.

Still another object of this invention is to provide a folding step in which collapsible suspension means of selected strength is utilized to maintain the steps in stepped disposition when disposed for step use but which automatically collapses and folds into compact disposition when the step is folded.

Still another object of this invention is to provide a folding step which may be releasably retained in folded disposition by a latch.

Still another object of this invention is to provide a folding step with treads of such size and so disposed as to permit employment of a single central latch to releasably retain the folding step in a compact disposition.

Still another object of this invention is to provide an H-shaped frame to support and protect folded step frames and to serve as a bumper for a vehicle to which the same is attached.

These, together with various auxiliary features and objects of the invention which will become apparent in the following description, are attained by the present invention, a preferred embodiment of which has been illustrated, by way of example only, in the accompanying drawings, wherein:

FIGURE 1 is a side elevation of the folding step disposed for step use and attached to a wheeled vehicle.

FIGURE 2 is a front elevation of a folding step disposed for step use and attached to a wheeled vehicle.

FIGURE 3 is a fragmentary front elevation of the folding step in folded position.

FIGURE 4 is a vertical transverse section taken on line 4—4 of FIGURE 2 showing the folding step in folded position.

FIGURE 5 is a horizontal section taken substantially on line 5—5 of FIGURE 1.

FIGURE 6 is an enlarged fragmentary vertical section taken on line 6—6 of FIGURE 1.

Referring now more particularly to the drawings, two vertical, spaced hangers 10 and 11, each consisting of a metal channel member are rigidly joined by plate 12 to form an H-frame 13. Slots 14 are provided in plate 12 so as to permit plate 12 to be fastened to the rear end of chassis frame members 15 and 16 of truck frames of differing widths by conventional means, as by bolted angle irons 17. Vertical hangers 10 and 11 are each joined at their respective upper ends to vehicle bed supporting member 32, as by bolt 32¹, and the lower ends thereof each respectively supported by a brace, as by brace 17¹ attached to chassis frame member 15.

Step frame 18 is composed of arms 19 and 20 and cross bars 21 and 22, formed from angle irons and rigidly joined together as by welding. Tread means, as metal lattice 23, is affixed to the top of step frame 18. Step frame 18 is pivoted upon pivot rod 24 extending between vertical hangers 10 and 11 and passing through the unjoined ends of arms 19 and 20. Filler block 25 provides additional support for step frame 18 upon pivot rod 24. Washer 26 separates spacer 27, which is welded to vertical hanger 11, from arm 20. Washer-like element 28 is welded to vertical hanger 11 and separates vertical hanger 11 from cotter pin 29, which retains pivot rod 24. A similar filler block, washer, spacer, washer-like element, and cotter pin are provided at the juncture of pivot rod 24 and vertical hanger 11. Pivot rod 24 extends between vertical hangers 10 and 11 near the bottom of H-frame 13 and near the surface thereof farthest from chassis frame members 15 and 16 of the vehicle to which H-frame 13 is attached.

As many additional step frames, as step frames 30 and 31, may be provided and similarly pivoted upon pivot rods extending between vertical hangers 10 and 11 of H-frame 13 as may be desired to form additional steps, the length of the pair of arms of each successive ascending step frame being of uniformly shorter length.

The pivot rod upon which each step frame is pivoted is spaced parallel and equidistant, both vertically and horizontally, from the pivot rods immediately below and above it in the array, so as to provide steps of equal rise and to allow all step frames to be disposed in parallel disposition in contact with immediately adjoining step frames when all are pivotally raised to a vertical position about their respective pivot rods. This horizontal spacing of the pivot rods is in the direction of the vehicle chassis frame members 15 and 16 from rod 24 and is such that when each step frame, commencing with step frame 18, is pivotally raised to a vertical position it forces, by camming action, the step frame next above it also to be pivotally raised about its respective pivot rod into a vertical position.

The pivot rod of the uppermost step frame, and of step frame 18 if there is to be but one step frame provided, is spaced horizontally from step frame restraining means, as provided in the illustrated embodiment by vehicle bed supporting member 32, which restrains such uppermost arm from continuing such pivotal movement beyond a vertical position. Step frame 18, H-frame 13, and any additional step frames, such as step frames 30 and 31, are each of such individual height as to dispose said step frames in stepped disposition with equal tread space exposed on each step frame when disposed horizontally for step use, as best illustrated in FIGURE 1, and to dispose said step frames with the ends thereof most distant from their respective pivot rods in substantially flush alignment with each other and with the upper end of H-frame 13 when in folded disposition, as best illustrated in FIGURE 4.

Eye bolts 33 are attached to the ends of the outer crossbars, as 21, of each step frame. Two chains 34 depending from two eye bolts 35 attached to vertical hangers 10 and 11, respectively, near the upper ends thereof, are fastened at points equidistant along each said chain, respectively, to eye bolts 33 on the corresponding side of each step frame so as to retain each step frame in a horizontal position vertically equidistant from each other step frame when the array of step frames is disposed for step use as best illustrated in FIGURE 1.

Catch bar 36 is an angle iron attached between arms 19 and 20 and between crossbar 22 and pivot rod 24 of step frame 18, the point of the angle thereof pointing substantially toward the rod 24. Latch tongue 37 is pivotally attached to latch base 38 and yieldingly held in a depressed position by latch spring 39, to form latch 40. Latch base 38 is fastened by conventional means, such as rivets 41, to plate 12 at such a height as to permit releasable engagement of latch tongue 37 with catch bar 36 when the step is disposed in folded position.

In operation, with the folding step attached to a vehicle as hereinbefore described and in folded disposition as best illustrated in FIGURE 4, latch tongue 37 is manually disengaged from catch bar 36 and the step frames are each allowed to descend to their respective horizontal positions about their respective pivot rods to form a series of steps of equal rise tautly retained by chains 34 as best illustrated in FIGURE 1. The step may then be used by passengers for mounting and dismounting the vehicle and for the loading and unloading of cargo.

When it is desired to fold the steps, as when the vehicle is to engage in travel or to back up to a loading dock, the lowest step frame, 18, is manually grasped and raised about its pivot rod 24 to a vertical position. In so doing, each step above said lowest step frame is, in turn, touched and itself raised and rotated about it own respective pivot rod by the step frame immediately below it, until all step frames are each in a vertical position and restrained from continuing such rotating motion by contact of the uppermost step frame with arm restraining means such as bed supporting member 32 in FIGURE 1. Latch tongue 37 now engages catch bar 36 and retains the lowest, and hence all, step frames in vertical position so long as desired. Chains 34 fold evenly and neatly and hang in the space maintained between the folded step frames and vertical hangers 10 and 11, respectively, by the spacers, as spacer 27.

It will be noted that vertical hangers 10 and 11 extend further to the rear of the vehicle to which the folding step is attached than do the step frames 18, 30 and 31, when the latter are in folded disposition. Vertical hangers 10 and 11 thus provide protection for step frames 18, 30 and 31 against damage should the vehicle to which the invention is attached back against a loading dock or other obstacle or suffer a rear-end collision. Further, vertical hangers 10 and 11 serve as a rear bumper for the vehicle to which the folding step is attached and protect the vehicle itself against damage from rear-end collision and from backing into a loading dock or other obstacle.

In view of the foregoing description taken in conjunction with the accompanying drawings, it is believed that a clear understanding of the construction, operation, and advantages of the folding step will be quite apparent to those skilled in the art.

It is to be understood, however, that even though there is herein shown and described a preferred embodiment of the invention, various changes may be made without departing from the spirit and full intendment of the invention.

What is claimed is:

1. In a folding stair for vehicles having a frame including a pair of vertical spaced hangers depending from said frame, a plurality of U-shaped step frames pivotally mounted by means of horizontal axles to and between said hangers at substantially the end portion of the legs of the respective step frames whereby to assume a horizontal position and a vertical position, the legs of each of the U-shaped step frames pivotally mounted between said hangers increasing in size downwardly, the pivot points of the step frames being displaced from each other in a step-wise manner longitudinally along said hangers and transversely with respect thereto, whereby said step frames are parallel to each other and the rear of said hangers and of the step frame pivoted lowermost thereon are flush to form a bumper having a co-planar surface when said step frames are in a vertical position, stair treads connecting the apex portion of each of the stair frames, a pair of sleeves rotatably surrounding each of said axles intermediate the legs of said step frames and each of said vertical hangers to space said step frames from the proximate hangers, to reduce friction between said step frames and hangers when said hangers are rotated upon said axles, and to form a pair of elongated vertical recesses therebetween when said step frames are in a vertical position, a pair of chains each attached at one end to one of said vertical hangers near the top thereof and at the other end to an outer end of said step frame, respectively, arranged to support said step frame in a horizontal position when disposed as a stair and to fold and depend within said recesses when said step frames are in a vertical position, and latch means to releasably retain the lowermost step frame in a vertical position thereby retaining the remaining step frames in a vertical position.

2. The article of claim 1 in which said latch means includes a catch bar connecting the legs of said lowermost step frame and a latch having a latch base attached to said plate, a notched latch tongue pivotally attached to said latch base, and a latch spring yieldingly retaining said latch tongue in a depressed position to engage said catch bar.

References Cited in the file of this patent

UNITED STATES PATENTS

| | | |
|---|---|---|
| 213,429 | Kirkham | Mar. 18, 1879 |
| 336,219 | Dormitzer | Feb. 16, 1886 |
| 597,706 | Brown | Jan. 25, 1898 |
| 720,891 | Hall et al. | Feb. 17, 1903 |
| 1,026,102 | Mather | May 14, 1912 |
| 1,760,422 | Mackie | May 22, 1930 |
| 2,246,986 | Pellegrini | June 24, 1941 |